(No Model.)

H. KROCKER.
FUNNEL FOR FILTERING LIQUIDS.

No. 575,608. Patented Jan. 19, 1897

Witnesses.
H. N. Jenkins
Lloyd F. Carroll

Inventor.
Hugo Krocker
By G. Dittmar
Attorney.

UNITED STATES PATENT OFFICE.

HUGO KROCKER, OF BERLIN, GERMANY.

FUNNEL FOR FILTERING LIQUIDS.

SPECIFICATION forming part of Letters Patent No. 575,608, dated January 19, 1897.

Application filed April 2, 1895. Renewed June 25, 1896. Serial No. 596,944. (No model.)

*To all whom it may concern:*

Be it known that I, HUGO KROCKER, a subject of the King of Prussia, Emperor of Germany, residing at 54 Köpnicker street, Berlin, Germany, have invented certain new and useful Improvements in Funnels for Filtering Liquids, of which the following is a specification.

This invention relates to an improved funnel for filtering liquids, and has for its object to prevent the adhering of the filtering-paper to the inner surface of the funnel. By the improved construction the filtering operation is facilitated and a breaking of the paper is prevented.

The improved funnel is illustrated in the accompanying drawings, in which—

Figure 1:
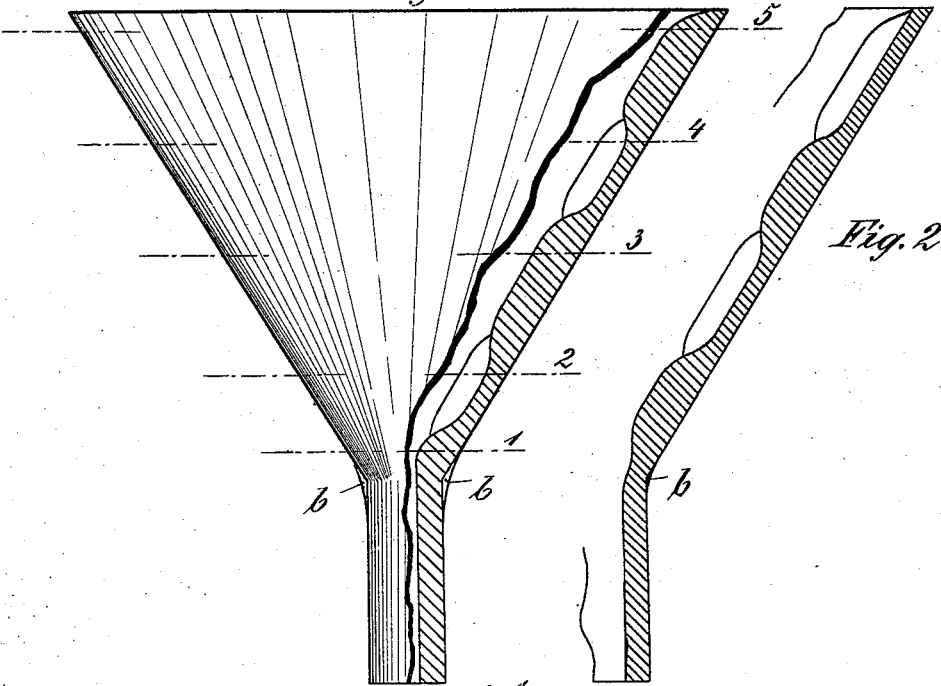
Figure 2:
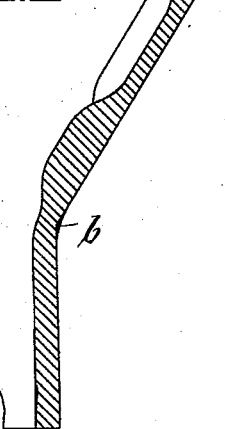
Figure 3:
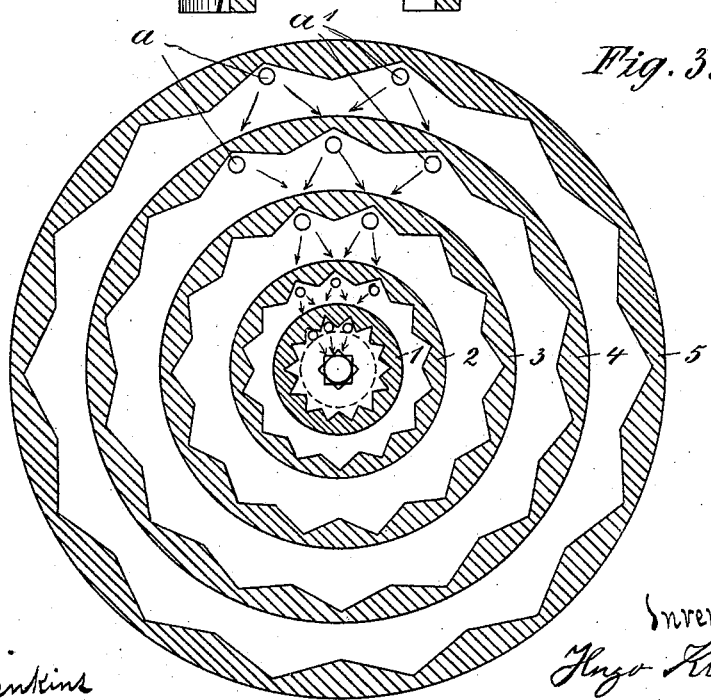

Figures 1 and 2 represent vertical sectional views. Fig. 3 represents a horizontal sectional view.

As may be seen in the drawings, the inner surface of the funnel is provided with converging vertical ribs, the projecting edges of which form a rest for the paper. In the different horizontal series the ribs are arranged on different planes, so that serpentine-like channels are formed, through which the liquid may flow down. In Figs. 1 and 2 may be seen the arrangement of the ribs. Suppose $a\ a'$ be two drops of the filtered liquid. Then the same would flow in the direction indicated by arrow. It is obvious that the number of series and number of ribs may be varied according to circumstances.

At the joint of the truncated funnel with the neck I provide externally-projecting ribs $b$, effecting the free admittance of air to the interior of the vessel.

Having now described the nature of my invention, I claim—

As a new article of manufacture, a funnel having its inner surface provided with several horizontal rows of converging vertical ribs, the ribs of the several rows being in different vertical lines, and each rib having a V-shaped vertical bearing, thereby insuring an uninterrupted outflow of the filtered liquid, substantially as set forth.

In testimony whereof I have signed my name to this specification in the presence of two subscribing witnesses.

HUGO KROCKER.

Witnesses:
    MAX WILH. WILRISH,
    PAUL VOCH.